UNITED STATES PATENT OFFICE.

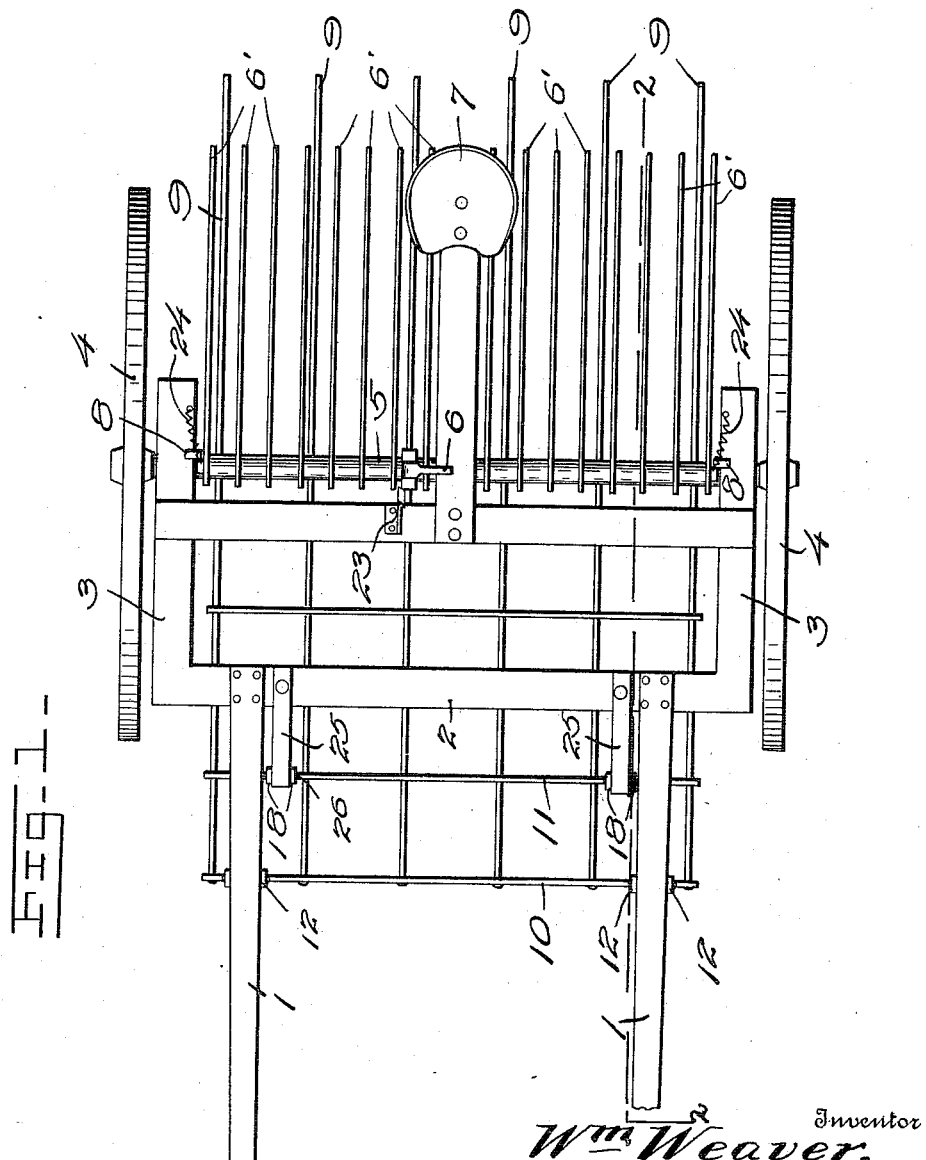

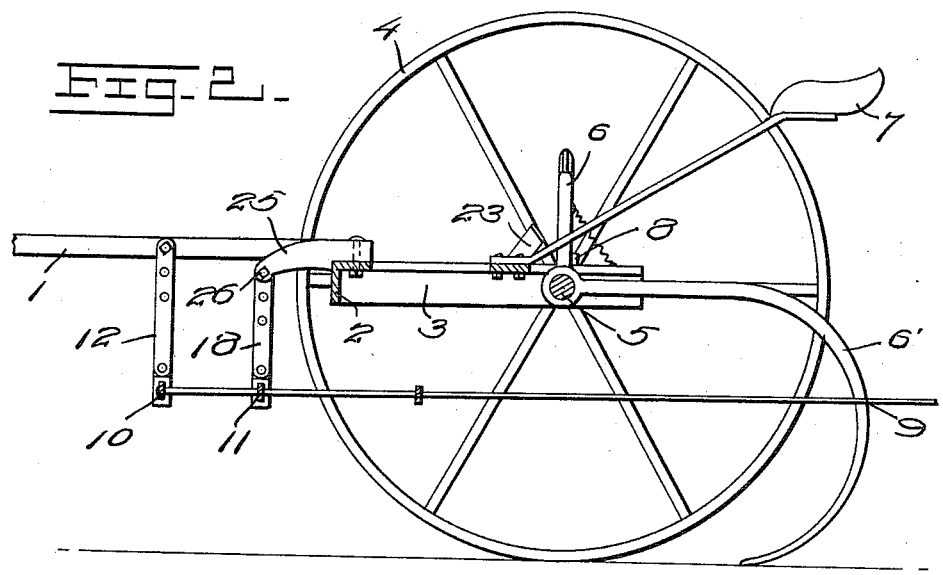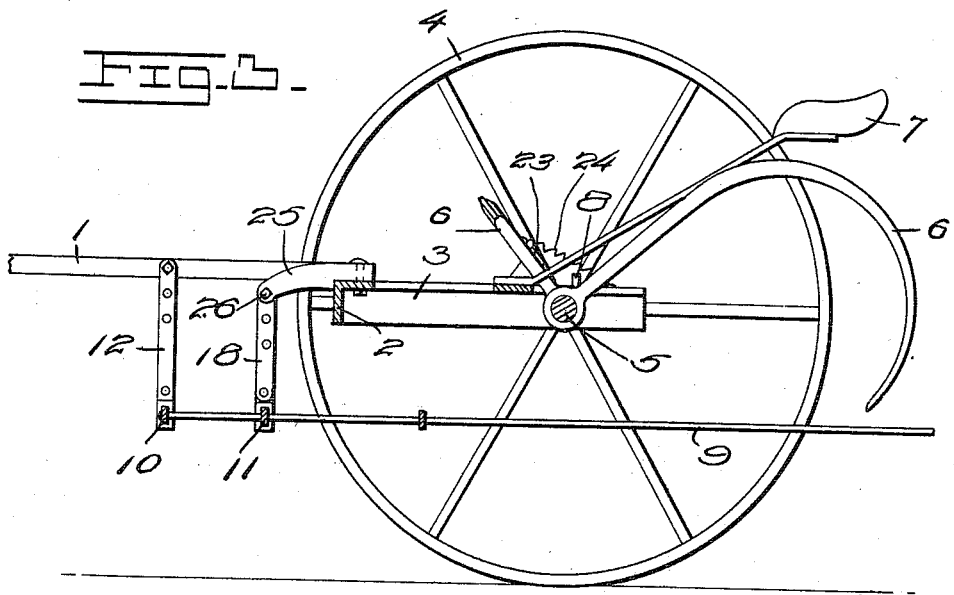

WILLIAM WEAVER, OF RIVERTON, UTAH.

CLEANING MECHANISM FOR HORSE-RAKES.

994,622.  Specification of Letters Patent.  Patented June 6, 1911.

Application filed April 19, 1910. Serial No. 556,302.

*To all whom it may concern:*

Be it known that I, WILLIAM WEAVER, a citizen of the United States, residing at Riverton, in the county of Salt Lake and State of Utah, have invented certain new and useful Improvements in Cleaning Mechanism for Horse-Rakes, of which the following is a specification.

This invention relates to cleaning mechanism for horse rakes.

It has for its object the providing of an attachment for a hay rake which, when the rake is raised for dumping, will compress the bundle of hay contained thereon so that one man may lift it.

Other objects and advantages will be apparent from the following description, and it will be understood that changes in the specific structure shown and described may be made within the scope of the claim without departing from the spirit of the invention.

In the drawings, Figure 1 is a top plan view of my rake cleaning mechanism, Fig. 2 is a sectional view along the line 2—2 of Fig. 1, and Fig. 3 is a view of Fig. 2, the rake being raised.

My attachment may be placed on a horse rake of any approved type, the mechanism of such horse rake being no part of my invention is not particularly shown and described.

In the drawings: 1 represents the shafts, 2 the connecting beam thereof, 3 the main frame which may be of angle iron or other suitable material and 4 the wheels of an ordinary horse rake adapted to carry my improved cleaning mechanism. Transverse the main frame and revolubly mounted therein is the shaft 5, which carries the rearwardly pointed and downwardly curved rake teeth 6'. Secured to the shaft 5 is the foot lever 6, so positioned on the shaft as to be in an upright position when the teeth are lowered, and adapted to be depressed in the direction of the arrow by a driver in the seat 7. A lug 8 is secured to the frame and is so placed as to limit the upward movement of the lever 6 so as to leave the rake teeth in the most advantageous position.

My rake cleaning mechanism consists of a plurality of parallel horizontal cleaning fingers 9, which pass between the rake teeth at suitable intervals, and extend rearwardly of the rake teeth a distance sufficient to allow the latter in their upward sweep to remain entirely forward of the extremities of the cleaning fingers. The cleaning fingers are kept in parallel spaced relation by two spaced parallel cross bars 10 and 11, which are riveted to the cleaning fingers at the points where they intersect. The cross bar 10 is placed at the forward end of the cleaning fingers, and the cross bar 11 a short distance rearwardly thereof. Secured to the shafts are the two pendent bracket arms 12, secured to the ends of which is the cross bar 10.

Carried centrally of the frame there are transversely spaced studs 25 from which are suspended hangers 18, connected to the cross bar 11, whereby the cleaning fingers are held rigidly in a substantially horizontal position. The studs 25 project forwardly, and are provided with an angularly recessed foot adapted to be easily secured upon the rake frame in any customary manner, as by bolts, and the outer ends of the studs are transversely apertured, to receive bolts 26 securing the hangers 18.

A catch 23 is provided on the frame 3 so that the lever 6 may be locked down when the rake is not in use; and a spring 24 is disposed between the lever and the main frame to assist in raising the lever and resiliently hold the rake teeth adjacent the ground.

In the operation of the mechanism, when a rake full of hay is gathered and it is desired to dump it, the lever 6 is depressed by the operator; this rotates the shaft 5, raising the rake teeth 6', said teeth working upward through the fingers 9 which effectually remove the hay from the teeth.

In heavy hay crops a contrivance of this character would be very valuable as the bunches of hay are not so bulky and may be easily handled by one man.

This attachment may be mounted on any style of horse rake with a few slight changes in structure, and may be cheaply and easily manufactured, and will be efficient in operation.

It will be noted that the bracket arms 12 and the hangers 18 project upwardly beyond the shafts and studs respectively, and have a series of longitudinally spaced perforations therethrough, the bracket arms being secured to the shaft by the engagement of a suitable pivot pin therethrough, and the hangers being similarly secured to the studs. When desired, these arms and hangers may be adjusted vertically to dispose the cleaning fingers at various heights with respect to the tangs of the rake, in order to make the device adjustable to use with various qualities of hay.

What is claimed is:

A horse rake comprising, drive wheels, a shaft supported by said drive wheels, a frame supported by said shaft, a bar extending transversely of said frame, a seat supported on said bar, a plurality of curved teeth rotatably mounted upon said shaft, a lever positioned on said shaft to raise and lower said teeth, means for locking said teeth in a lowered position, a second frame arranged below the first mentioned frame, said frame consisting of a plurality of resilient fingers extending between the teeth of the rake, a pair of transversely arranged bars connecting said fingers, a plurality of curved members adapted to support said frame, said members being adjustably connected to one of said transverse bars, and an adjustable connection between the other transverse bar and the shafts of the rake.

In testimony whereof I affix my signature, in presence of two witnesses.

WILLIAM WEAVER.

Witnesses:
WM. HOKES,
JOHN HANSEN.

---

Copies of this patent may be obtained for five cents each, by addressing the "Commissioner of Patents, Washington, D. C."